(12) United States Patent
Ishida et al.

(10) Patent No.: US 7,984,465 B2
(45) Date of Patent: Jul. 19, 2011

(54) BROADCASTING DATA CONVERTER

(75) Inventors: Takaharu Ishida, Hitachinaka (JP); Yoshihito Sato, Hitachi (JP); Osamu Tomobe, Mito (JP); Toshiyuki Oda, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 12/021,405

(22) Filed: Jan. 29, 2008

(65) Prior Publication Data

US 2008/0209466 A1  Aug. 28, 2008

(30) Foreign Application Priority Data

Feb. 22, 2007 (JP) ................. 2007-041574

(51) Int. Cl.
*H04N 7/10* (2006.01)
*H04N 7/025* (2006.01)
(52) U.S. Cl. .................. 725/33; 375/240.28
(58) Field of Classification Search .......... None
See application file for complete search history.

(56) References Cited

U.S. PATENT DOCUMENTS

| | | | |
|---|---|---|---|
| 7,616,942 B2 * | 11/2009 | Karl et al. .................. 455/404.1 |
| 2004/0136408 A1 | 7/2004 | Tomobe et al. |
| 2005/0085183 A1 * | 4/2005 | Lee ............................. 455/3.01 |
| 2006/0105703 A1 * | 5/2006 | Takizawa et al. ............ 455/3.01 |
| 2006/0161946 A1 * | 7/2006 | Shin ............................... 725/33 |
| 2007/0182586 A1 * | 8/2007 | Mitsuhashi .................... 340/902 |
| 2008/0085695 A1 * | 4/2008 | Vare et al. ................... 455/404.1 |
| 2009/0110082 A1 * | 4/2009 | Ahmed et al. ........... 375/240.27 |
| 2009/0307720 A1 * | 12/2009 | Turner ............................ 725/33 |

FOREIGN PATENT DOCUMENTS

| | | |
|---|---|---|
| EP | 1 104 128 | 5/2001 |
| EP | 1 161 096 | 12/2001 |
| EP | 1693999 A1 * | 8/2006 |
| GB | 2 418 803 | 4/2006 |
| JP | 2001-045371 | 2/2001 |
| JP | 2004-088492 | 3/2004 |
| JP | 2004-135315 | 4/2004 |
| JP | 2005-057344 | 3/2005 |
| JP | 2005-079753 | 3/2005 |
| JP | 2005-277630 | 10/2005 |
| WO | WO 02/082699 A1 | 10/2002 |

\* cited by examiner

*Primary Examiner* — Andrew Y Koenig
*Assistant Examiner* — Jason Chung
(74) *Attorney, Agent, or Firm* — Antonelli, Terry, Stout & Kraus, LLP.

(57) ABSTRACT

A relay station comprises an emergency information detection unit for detecting an emergency information broadcasting flag in the digital broadcasting TMCC signal transmitted from the center station; a replacement data creation unit for issuing an instruction for creating replacement contents and replacing the data when emergency information is multiplexed in the TS; and a time synchronization unit for executing time synchronization between the TS created by the data replacement and the TS before the data replacement. On a receiving terminal, the replaced data broadcasting contents can be received while prefectural broadcasting video and audio contents are continuously received.

1 Claim, 8 Drawing Sheets

```
emergency_information_descriptor() {
            descriptor_tag
            descriptor_length
            for (i=0;i<N;i++) {
                        service_id
                        start_end_flag
                        signal_level
                        reserved_future_use
                        area_code_length
                        for (j=0;j<N;j++) {                    301
                                    area_code             ╱
                                    ┌──────────────────────┐
                                    │ reserved_future_use  │
                                    └──────────────────────┘
                        }
            }
}
```

BROADCASTING DATA CONVERTER

CLAIM OF PRIORITY

The present application claims priority from Japanese application serial No. 2007-41574, filed on Feb. 22, 2007, the content of which is hereby incorporated by references into this application.

BACKGROUND OF THE INVENTION

The present invention relates to a data converter for receiving data sent from outside, replacing a part of the received data, and outputting the data.

The ISDB-T (Integrated Services Digital Broadcasting, Terrestrial) which started on December 2003 in Japan is unlike conventional terrestrial digital broadcasting and can broadcast not only video and audio but also community-based data. However, even when executing community-based data broadcasting, data must be updated by each broadcasting station; accordingly, the community-based data broadcasting is limited to the broadcasting of data varied in units of prefectural broadcasting.

On the contrary, there is proposed area-broadcasting similar to a conventional small-scale FM station in which corresponding prefectural broadcasting units are further segmented. This broadcasting system uses the same frequency as used for the prefectural-based data broadcasting and broadcasts the same video and audio contents as broadcasted in units of prefectural broadcasting. Furthermore, this broadcasting system can send out data broadcasting unique to a specific narrow area, namely, for example, a shielded environment such as underground mall and an amusement facility, and which enables users to receive data via data broadcasting and display contents of the received data only in the corresponding area.

In general, in many cases as to the broadcasting limited to a specific area, information is delivered via a communication system such as a multicast-system communication medium using the Internet, rather than using a broadcasting system. However, in an information delivery system that uses a communication medium like a multicast system, if important information, such as disaster information including information about earthquakes expected to occur in Japan or emergency information, is broadcasted to receivers and many of the receivers access the delivery source of information in a short period of time, the occurrence of congestion is inevitable, causing communication failure; consequently, there is a high possibility that necessary information is not delivered to all of the receivers. Therefore, in order to make area-broadcasting continuously available in case of the occurrence of emergency information or disaster information, it is obvious that the area-broadcasting should be achieved by using a broadcasting medium rather than using a communication medium.

Specifically, in the ISDB-T terrestrial digital broadcasting system, it is possible to use one-segment terrestrial digital broadcasting which enables mobiles to receive broadcasting; therefore, it is possible to send information to many users in the broadcasting area. The subject is how to send out data broadcasting unique to the above-mentioned shielded environment or amusement facility by using the broadcasting system within a framework of terrestrial digital broadcasting.

In order to broadcast the same video and audio as that broadcasted by a prefectural broadcasting station and broadcast data unique to a specific narrow area such as the above-mentioned shielded environment or amusement facility, from the viewpoint of the effective use of the broadcasting data band, it is necessary to provide a relay station for each specific narrow area as an area-broadcasting target; wherein each relay station is used to replace prefectural broadcasting data contents with local broadcasting data contents and send out data broadcasting of the replaced contents. To achieve this broadcasting, it is necessary to provide a broadcasting data converter for replacing the data broadcasting contents in each relay station.

With regard to an apparatus which replaces data broadcasting contents in a relay station, a technology has been disclosed in Japanese Patent Laid-open No. 2004-135315 and the Journal of technical disclosure WO02/082699.

Among those, a system described in Japanese Patent Laid-open No. 2004-135315 is configured to output data replacing a part of the data while keeping a data input speed and a data output speed identical. According to this system, data transmission speed can be kept constant between a data broadcasting program broadcasted by a key station and a data broadcasting program broadcasted by a local station. Accordingly, even any local area can do data broadcasting with a frequency band equivalent to that of a key station, thereby making it possible to change contents of the data broadcasting program according to the regional characteristics without changing the frequency band.

Furthermore, Internal publication No. WO02/082699 discloses the following data broadcasting program stream transmission system. The system produces a data broadcasting program stream in which contents including a plurality of commercial messages and event messages corresponding to each commercial message are repeatedly multiplexed. When a receiver is received the data broadcasting program stream, it separates constituent elements of the data broadcasting program from the contents, and determines whether to include each constituent element in the contents. When determining that a commercial message should be included in the contents, a message for controlling the commercial message processing timing is included together with the commercial message; or when determining that a certain commercial message should be not included, the data broadcasting program stream which repeatedly multiplexes the contents not including the event message corresponding to commercial message is outputted. Furthermore, the system discloses the following data broadcasting program stream transmission unit. That is, when a data broadcasting program multiplexed with a transport stream is broadcasted together with a digital broadcasting program, the apparatus uses a first data broadcasting program transport stream distributed over the Internet by another broadcasting station. Thereby, it is possible for a receiving unit to control the commercial message processing timing by receiving the message.

Furthermore, Japanese Patent Laid-open No. 2001-045371 discloses a television picture switching method for detecting the boundaries of a plurality of continuously transmitted TV broadcasting materials by detecting a replacement frame and replacing a plurality of TV broadcasting materials.

SUMMARY OF THE INVENTION

Problems to be Solved by the Invention

In the above-mentioned area-broadcasting system, if an emergency information flag enters into the transmission and multiplexing configuration control (hereafter, referred to as "TMCC") signal of the MPEG-2 transport stream (hereafter, referred to as "TS"), it is difficult for a prefectural broadcasting station alone to broadcast community-based information only. Therefore, it is necessary for each relay station to quickly re-multiplex specific emergency information to reduce damage by disaster and broadcast the information to the adjacent areas. Furthermore, it is necessary to broadcast the same audio video contents by the prefectural broadcasting. Thus, in order to quickly deliver information, it is a subject how to quickly replace corresponding broadcasting data with appropriate timing for starting and ending information delivery while synchronizing with the video and audio programs.

However, according to the above-mentioned conventional technology, with regard to the program switching timing disclosed in the Japanese Patent Laid-open No. 2001-045371, it is not clear, for example, whether the program is switched according to a station break or by an "un-time" or determined by another method, and it is not considered that the data broadcasting program is to be quickly changed in case of emergency while synchronizing with the video and audio broadcasting contents.

The present invention relates to a data replacement unit for receiving data sent from outside, replacing a part of the received data and outputting the data. The apparatus intends to provide a broadcasting data converter for quickly replacing broadcasting data by considering the data replacement timing.

The present invention is characterized as follows. A broadcasting data converter is located in a relay station; the broadcasting data converter is comprised of: an emergency information detection unit for determining an emergency warning broadcasting-activation flag which is set when emergency information typified by disaster information is generated to the TMCC signal contained in digital broadcasting signals transmitted from the center station; a replacement data creation unit for issuing an instruction for creating replaced contents and replacing the data when the emergency information detection unit determines that the emergency information is multiplexed in original TS data transmitted from a center station; and a time synchronization unit for executing time synchronization between TS data created by the replacement data creation unit and the original TS data before replacement. The time synchronization unit is included in the system.

Thus, prefectural broadcasting video and audio contents can be continuously received on a receiving terminal and also data broadcasting contents unique to a specific area that has been replaced can be received.

DETAILED DESCRIPTION OF THE PREFERRED EMBODIMENTS

Hereafter, an embodiment of the present invention will be described with reference to the drawings.

Embodiment 1

Figure 1:
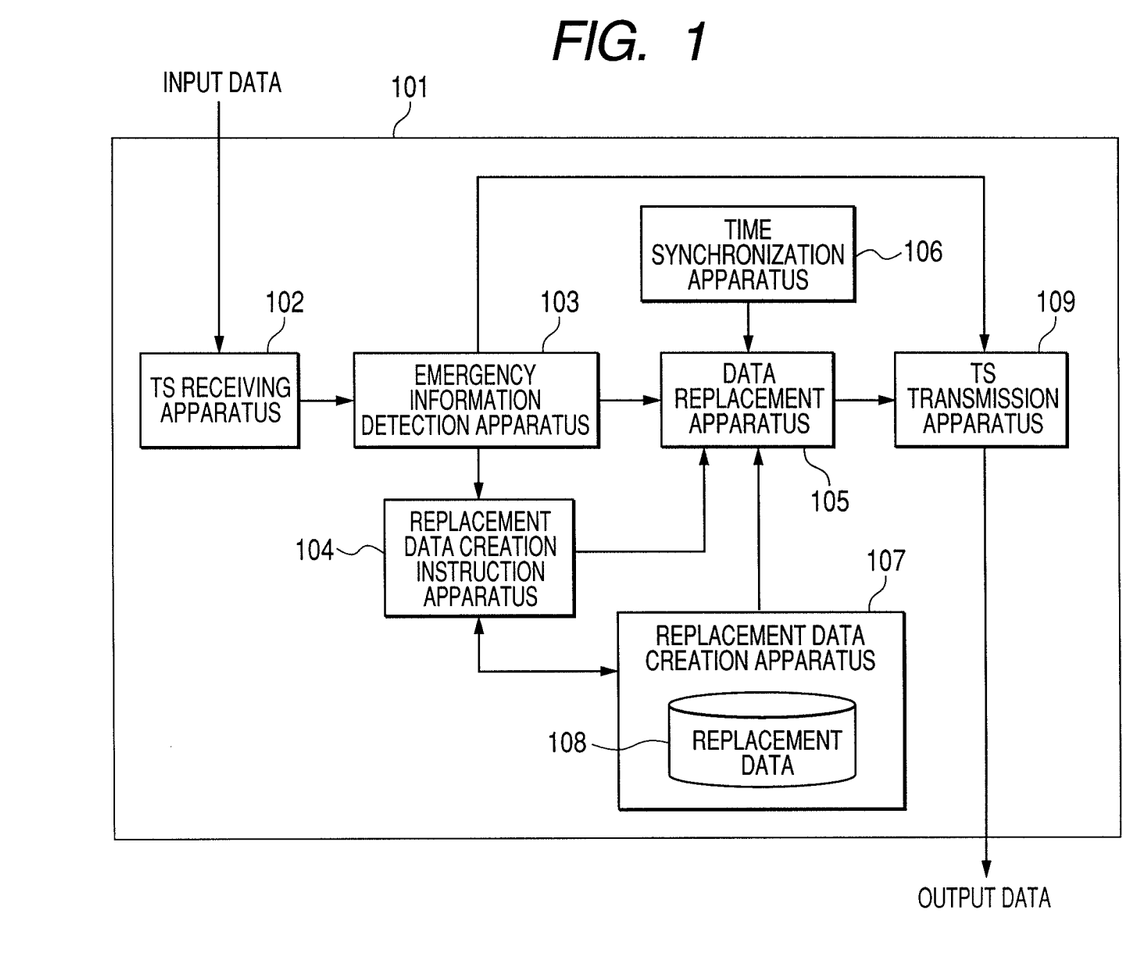
FIG. 1 shows a configuration of a first embodiment employing the present invention.

FIG. 1 shows a first embodiment of a broadcasting data converter employing the present invention. A broadcasting data converter 101 comprises a transport stream receiving unit (TS receiving unit) 102, an emergency information detection unit 103, a replacement data creation instruction unit 104, a data replacement unit 105, a time synchronization unit 106, a replacement data creation unit 107, and a transport stream transmission unit (TS transmission unit) 109.

In the present invention, an emergency information detection unit 103 is to recognize an emergency warning broadcasting activation flag, and it always monitors the activation flag in the TMCC signal described in ARIB TR-B14 in the broadcasting system using the ISDB-T. When the emergency information detection unit 103 recognized that an activation control signal is exist in the activation flag, it sends an activation control signal to the replacement data creation instruction unit 104. Triggered by the reception of the activation control signal, the replacement data creation instruction unit 104 instructs the replacement data creation unit 107 to create replacement data 108. The replacement data creation unit 107 uses replacement data 108 to automatically create PSI/SI (Program Specific Information/Service Information) data and data contents which are to replace TS data. The PSI/SI data and the data contents are necessary for replacing TS data. The PSI/SI data includes information about a program in TS and/or a program to which coded images and audio of TS belong. Alternatively, the replacement data creation unit 107 retrieves the TS data that has been created beforehand and sends the TS data to the data replacement unit 105. The data replacement unit 105 replaces data to be replaced with the received replacement data. Time information of the TS data is synchronized with time signal sent from the time synchronization unit 106 after the data is replaced in order to be synchronized with the prefectural broadcasting.

The data replacement unit 105 describes a discriminator on the renewed PSI/SI after replacement. The discriminator indicates whether the data is prefectural broadcasting data or renewed (replaced) data.

Hereinafter a configuration of the broadcasting data converter 101 will be explained in detail. Here, input data inputted to the TS receiving unit 102 is treated as TS data to be replaced. Output data from the transmission unit 109 is treated as replaced data where replacement has been completed. A bit rate of the TS of the input data and that of the output data in FIG. 1 are the same to simplify the explanation. Accordingly, a bit rate of the TS transmitted from the replacement data creation unit 107 is also the same.

The TS receiving unit 102 receives TS-format data sent to the relay station via communication lines as input data. The emergency information detection unit 103 takes in the data inputted into the TS receiving unit 102. The emergency information detection unit 103 monitors an emergency warning broadcasting activation flag included in TMCC signal described in ARIB-STDB31 multiplexed in TS. The emergency warning broadcasting activation flag corresponds to the B26-field of the TMCC data in FIG. 2. The emergency information detection unit 103 determines presence or absence of the emergency warning activation control, and start or finish of the emergency warning activation control from a change of the flag. When the emergency warning activation control starts or is in on-state, the emergency information detection unit 103 instructs the replacement data creation instruction unit 104 via a replacement signal to create data for replacing TS data. After receiving the replacement signal sent from the emergency information detection unit 103, the replacement data creation instruction unit 104 instructs the replacement data creation unit 107 to create PSI/SI information necessary for data replacement and to search and create replacement broadcasting data. Based on the replacement data created herein, the data replacement unit 105 replaces broadcasting data from original data to be replaced into the created replacement data. When replacing broadcasting data, time information of the replaced data is accurately corrected based on the time information sent from the time synchronization unit 106. Time information made by adding transmission time delay into a PCR (Program Clock Reference) value of the TS in the original data, or time information such as JST (Japan Standard Time), may be used for the signal sent from the time synchronization unit 106 to the data replacement unit 105. The TS transmission unit 109 transmits the replaced data TS to an external apparatus.

Figure 2:
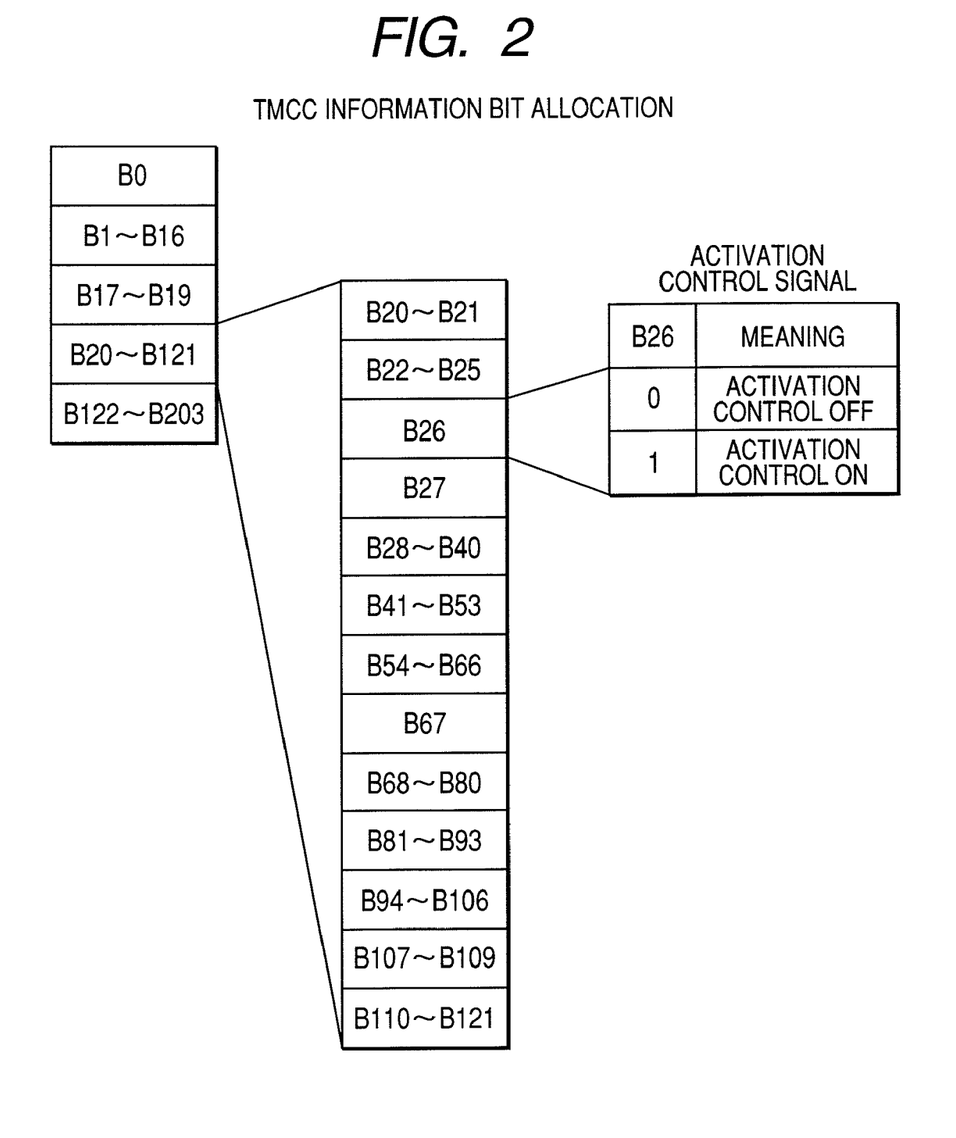
FIG. 2 explains an emergency warning broadcasting activation flag of the TMCC.
Figure 3:
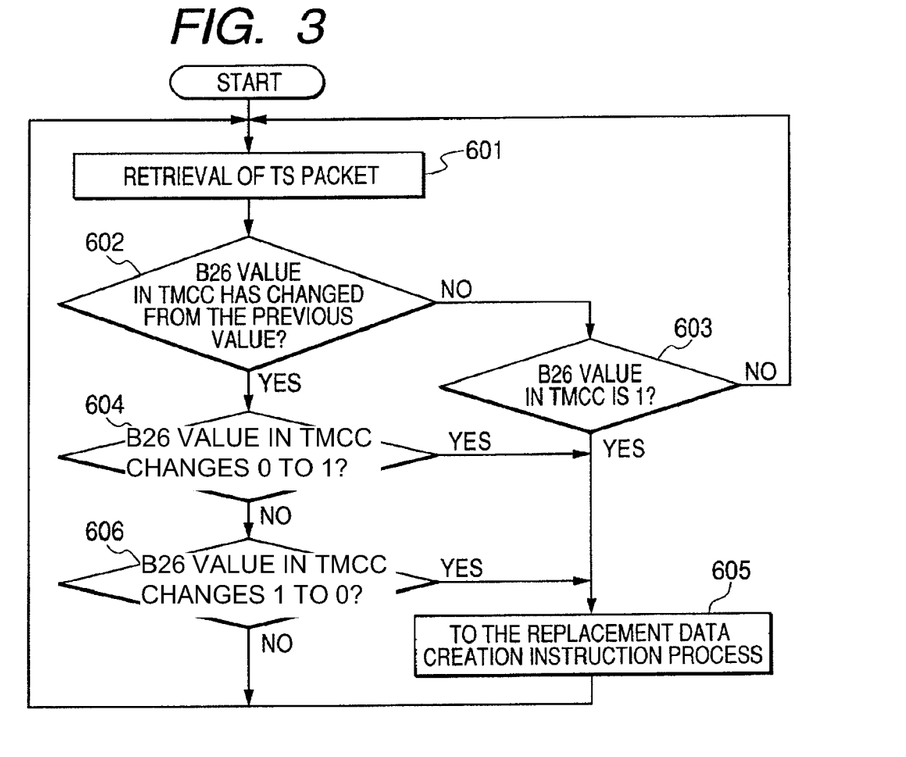
FIG. 3 is a flow chart of an emergency information detection unit.

A processing executed by the emergency information detection unit 103 will be described with reference to FIG. 3. First, in process 601, a TS packet is got from the data received by the TS receiving unit 102. Then, in process 602, flag data in the B26-field in FIG. 2 is read from the TMCC signal and compared with that in the TMCC signal in the previous TS packet which has been stored on a memory, determining whether the data in the B26-field has changed or not. When data has not changed, operation proceeds to process 603, and the flag value in the B26-field is evaluated. When the flag value is "0", the process returns to the beginning of the operation to get a TS packet.

Conversely, the flag value is "1" in process 603, the operation proceeds to process 605, and an instruction for data replacement is sent to the replacement data creation instruction unit 104. In process 602, when the value of the B26-field in the TMCC is different from the previous value, the operation proceeds to process 604, and it is checked whether the value of the B26-field has changed from "0" to "1". If so, the process proceeds to the replacement data creation instruction process 605. On the other hand, when the value of the B26-field has not changed from 0 to 1, the operation proceeds to process 606 and it is checked whether the value of the B26-field in the TMCC has changed from "1" to "0". If so, the operation proceeds to the replacement data creation instruction process 605 in order to return to the state before the emergency warning system is executed.

Figure 4:
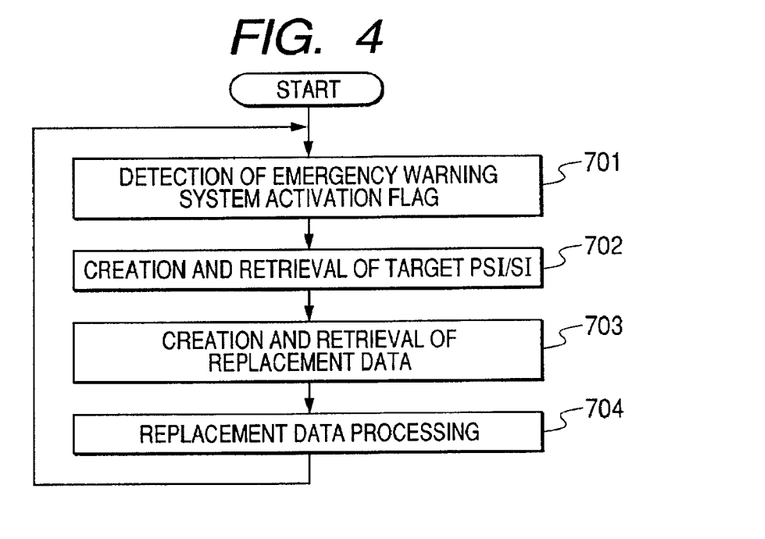
FIG. 4 is a flow chart of a replacement data creation instruction unit.

Processing executed by the replacement data creation instruction unit 104 and the replacement data creation unit 107 will be described as follows. As shown in FIG. 4, the replacement data creation instruction unit 104 instructs the replacement data creation unit 107 to create replacement data after detecting the emergency warning broadcasting activation flag in process 701. The replacement data creation unit 107 receives this instruction and creates PSI/SI information in the stream to be replaced in process 702. In this process, PSI/SI information before replacement is stored on a memory. The renewed (replacement) PSI/SI data after replacement is retrieved from replacement data 108 by the replacement data creation unit 107. Next, in process 703, data related to replacement broadcasting data is created or retrieved by the replacement data creation unit 107. The retrieved data has been stored beforehand as TS data. This data is created or retrieved in the same manner as the PSI/SI is as described above. When all the replacement data is ready, the data replacement main process is executed in process 704 by the data replacement unit 105.

Figure 5:
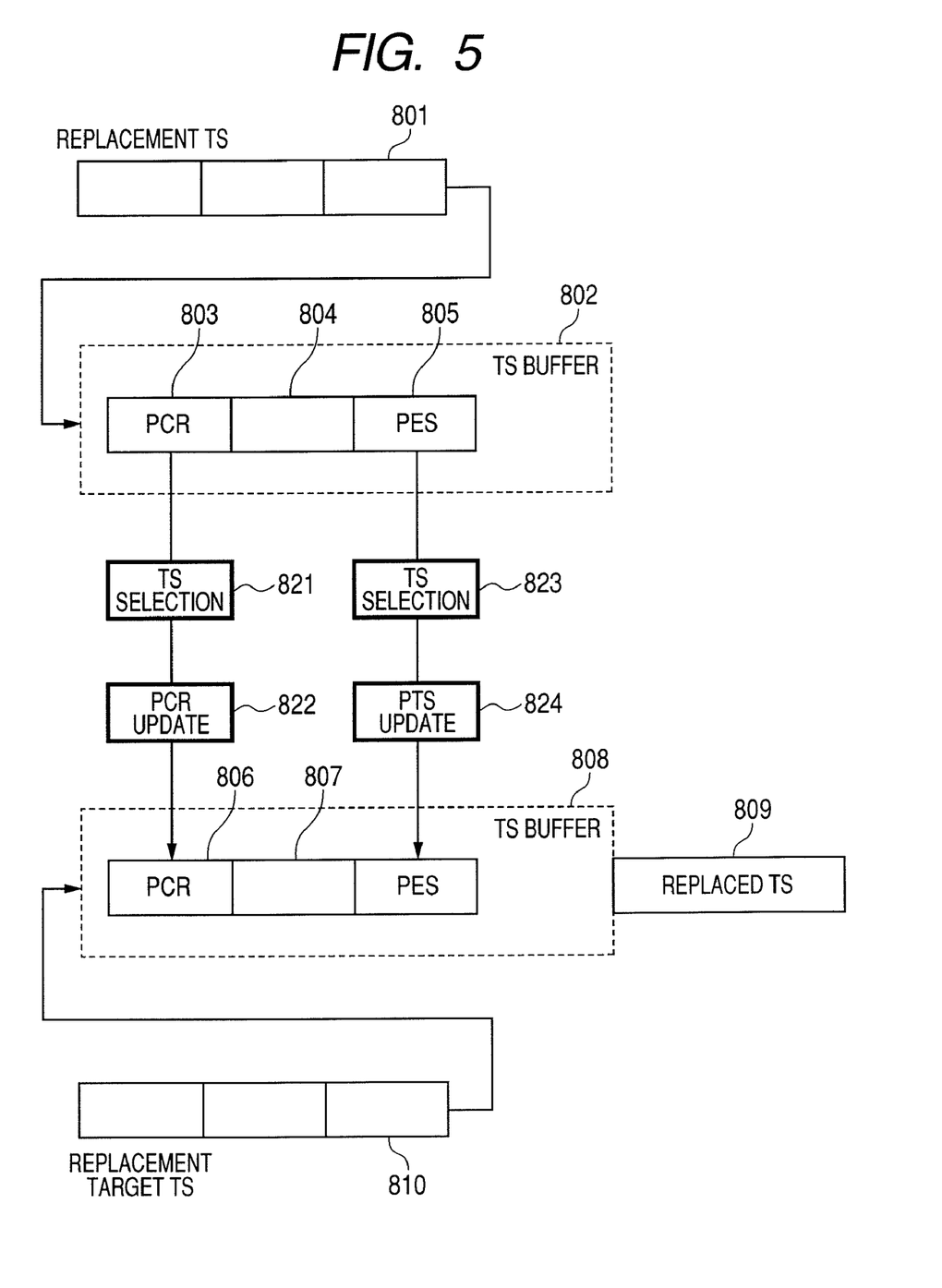
FIG. 5 explains how a PES packet is replaced.

There are two kinds of packets as packets to be replaced: one is PES (Packetized Elementary Stream) packet in which video and audio stream data is multiplexed and another is section packet in which broadcasting data is multiplexed. First, an explanation will be given referring to FIG. 5 about the case where a PES packet is replaced. Number 801 in FIG. 5 denotes renewed TS data (replacement TS) after replacement and number 810 denotes TS data to be replaced (replacement target TS). Replacement TS 801 is sequentially stored with time in the TS buffer 802 located in the data replacement unit 105. With regard to the TS packet including a PES packet stored in the TS buffer 802, the value of the PCR packet 803 in FIG. 5 is set to be synchronized with the time signal from the time synchronization unit 106. The PID of the replacement target TS 810 is the same as that of the replacement TS 801.

When the replacement target TS 810 with the same PID as the replacement TS 801 has entered the TS buffer 808, TS selection 821 is executed to select corresponding TS from the TS buffer 802 for the replacement TS 801. Subsequently, PCR update processing 822 is executed to update the PCR 806 of the corresponding TS to a value synchronized with the replacement target TS 810. The PCR is replaced in this way. When a PES packet 805 with the same PID as the replacement TS 801 has entered the TS buffer 808, TS selection 823 is executed to select the corresponding TS packet from appropriate replacement TS 801. Subsequently, PTS update processing 824 is executed to update the PTS in the PES packet. Replaced TS 809 is created by replacing the TS packet containing PES in the updated TS buffer 808 with the contents of the TS buffer 808. By executing the above processes continuously, the TS containing video and audio data is replaced.

Figure 6:
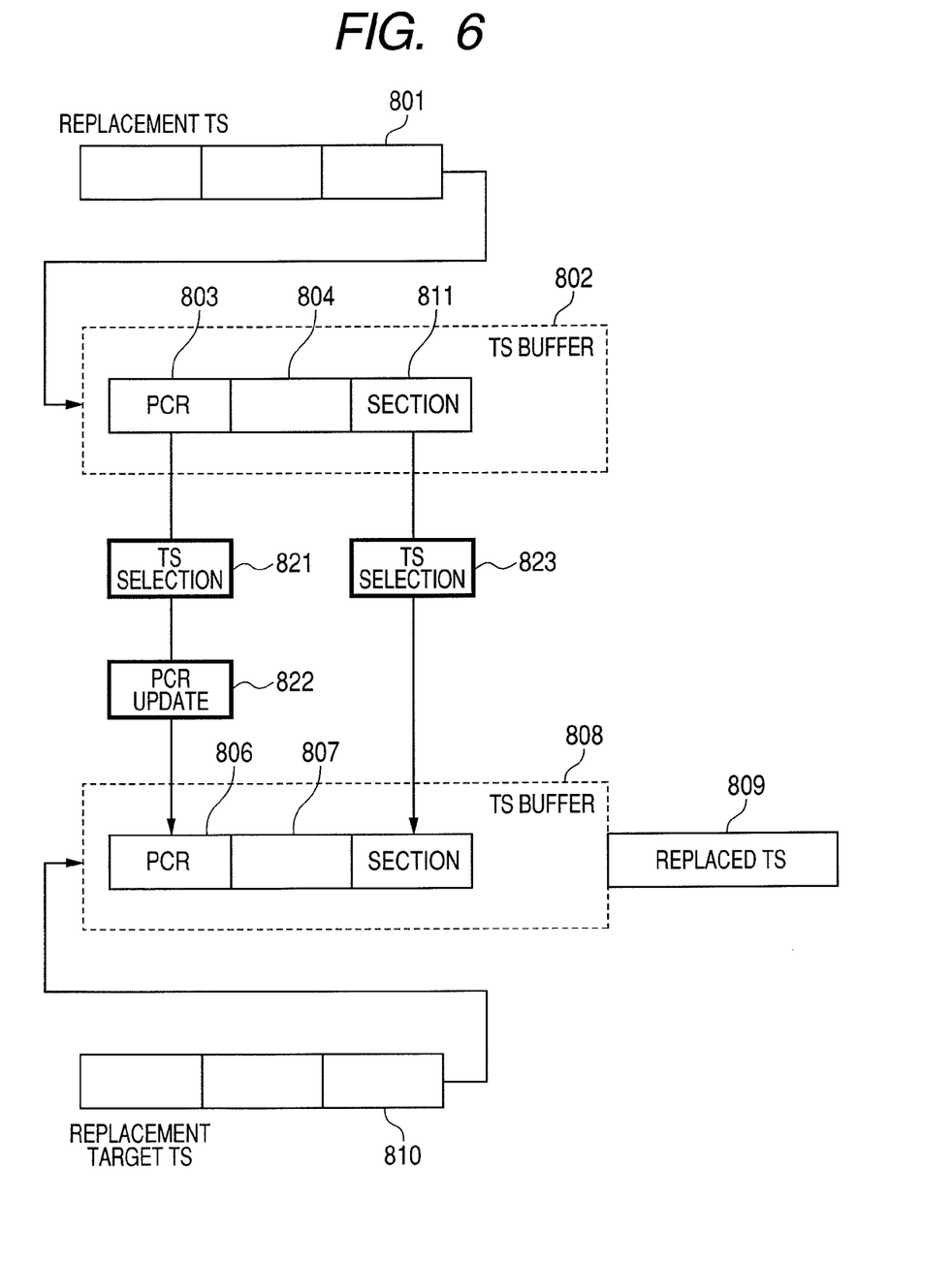
FIG. 6 explains how a section packet is replaced.

Next, the replacement of broadcasting data namely section packet will be described with reference to FIG. 6. Replacement TS 801 is sequentially stored in the TS buffer 802 with time. With regard to the TS packet including the PES packet stored in the TS buffer 802, the value of the PCR packet 803 in FIG. 6 is set to be synchronized with the time signal from the time synchronization unit 106. The PID of the replacement target TS 810 is the same as that of the replacement TS 801. When a replacement target TS 810 with same PID as the replacement TS 801 has entered the TS buffer 808 for the replacement target TS, TS selection 821 is executed to select corresponding TS from the TS buffer 802 for the replacement TS. Subsequently, PCR update 822 updates the PCR 806 of the corresponding TS to a value synchronized with the replacement target TS 810. The PCR is replaced in this way. When a section packet 811 with the same PID as the replacement TS 801 has entered the TS buffer 808, TS selection 823 is executed to select the corresponding TS packet from appropriate replacement TS 801. Subsequently, the section packet is replaced in the TS buffer 808. By executing the above processes continuously, the section packet is replaced.

Figure 7:
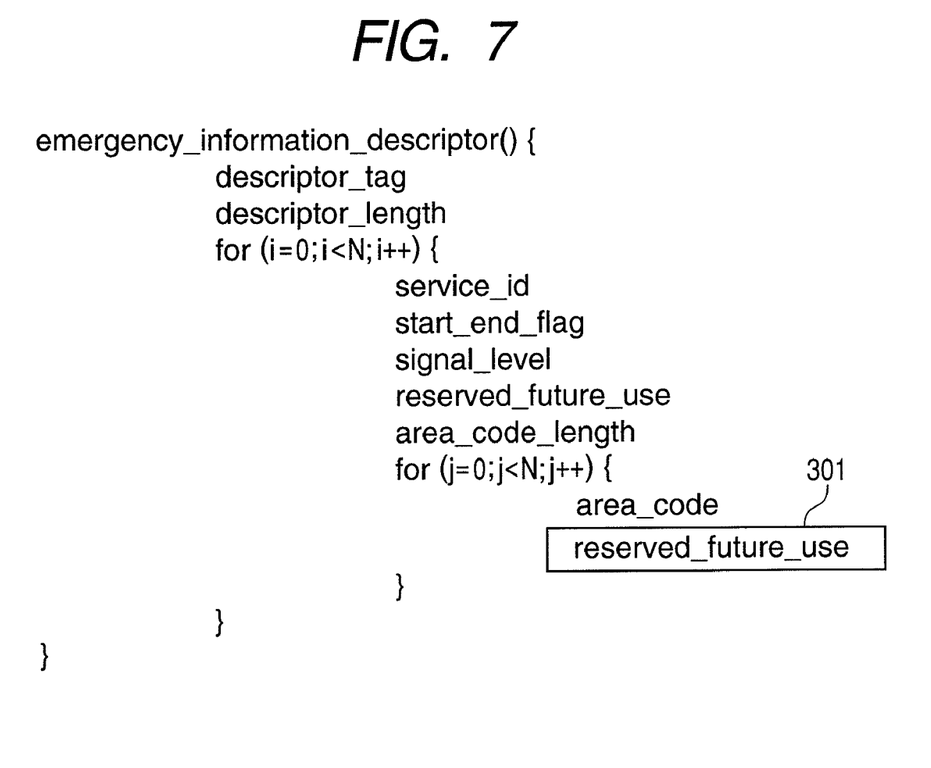
FIG. 7 explains the data arrangement in the PMT.

FIG. 7 shows an example of arrangement of PMT (Program Map Table) data when the PSI/SI is replaced. The PMT must be updated when the TS is replaced. The present invention replaces data distinctively with community-based unique contents. Emergency information descriptor in FIG. 7 has a reserved region 301 where area code corresponding to region 301 is to be described. The reserved region 301 in FIG. 7 shows a state which is replaced from an empty state to a state indicating that the contents currently being broadcasted are the replaced TS according to the emergency warning broadcasting activation flag.

Figure 8:
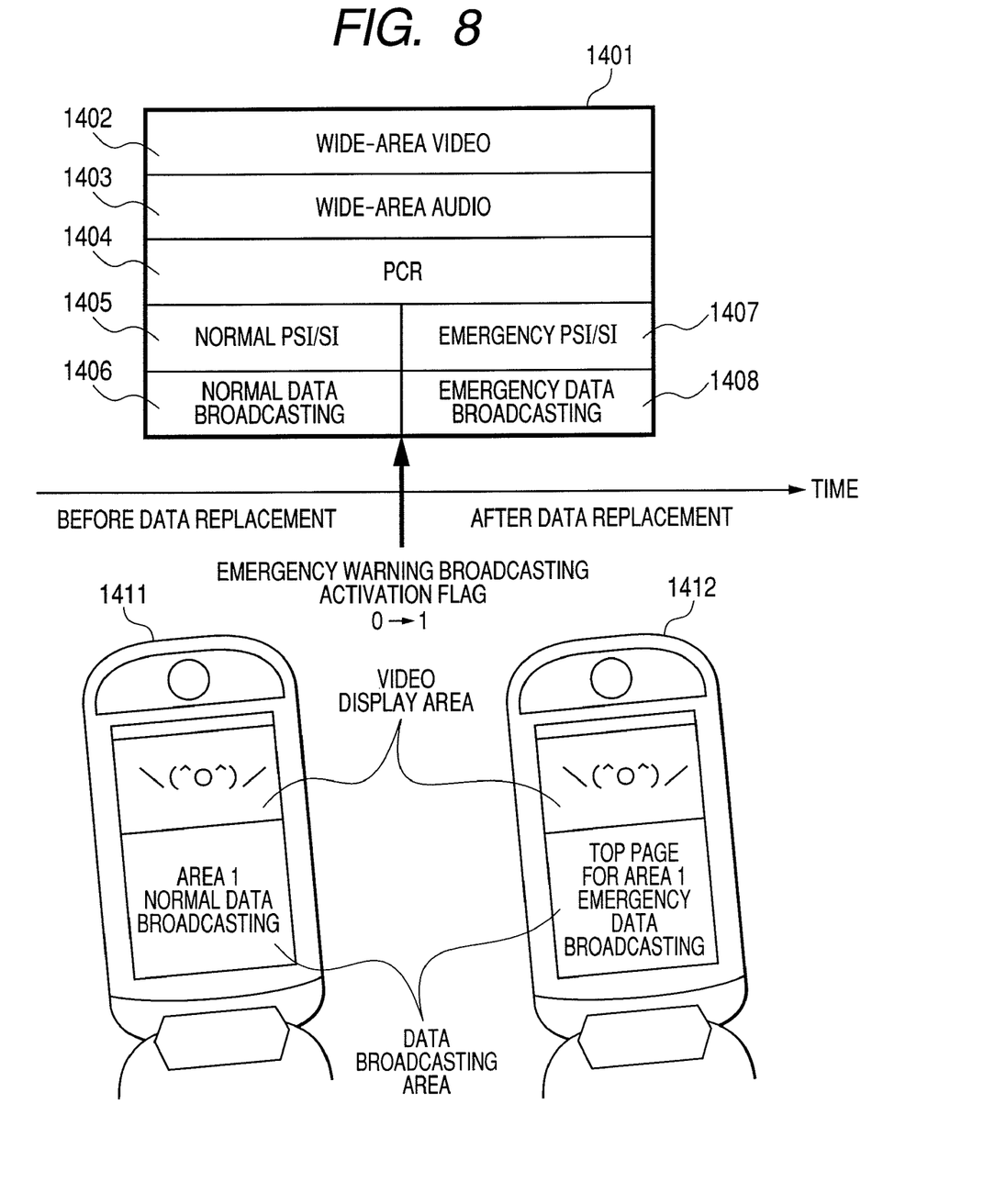
FIG. 8 shows replacement of the stream data and display screens on a receiving terminal.

FIG. 8 shows the states of the TS before and after the data replacement and display screens on a receiving terminal. Number 1401 denotes the entire TS stream before and after the TS replacement, including regions which store the following data respectively: wide-area broadcasting video 1402, wide-area broadcasting audio 1403, PCR 1404, normal PSI/SI 1405 before the TS replacement, emergency PSI/SI 1407 after the emergency warning broadcasting activation flag becomes "1", normal wide-area data broadcasting 1406, and emergency wide-area data broadcasting 1408 after the emergency warning broadcasting activation flag becomes 1. The vertical arrow in FIG. 8 indicates a time point when the value of the emergency warning broadcasting activation flag changes from "0" to "1".

Numbers 1411 and 1412 denote examples of the displays on the receiving terminal before and after the emergency warning broadcasting activation flag is activated, respectively. Video data is displayed in a video display area, which is the upper half of the screen on the receiving terminal. Contents of data broadcasting are displayed in a data broadcasting area in the lower half of the screen on the receiving terminal. The same content is displayed on the video display area in examples 1411 and 1412. On the other hand, in the data broadcasting area, the contents of data broadcasting are replaced when the value of the emergency warning broadcasting activation flag changes.

Figure 9:
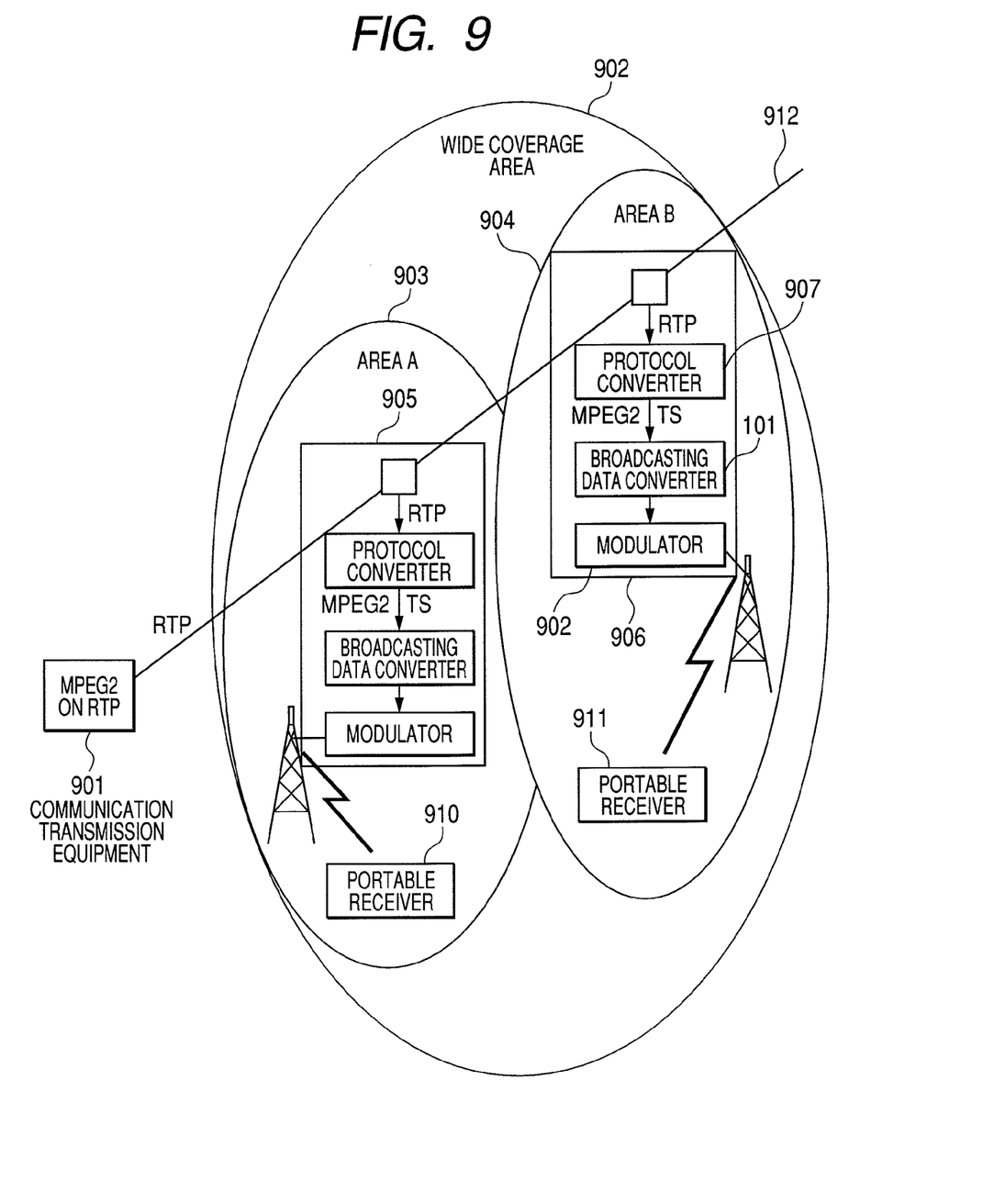
FIG. 9 shows an example of an area broadcasting with a broadcasting data converter employing the present invention.

FIG. 9 shows an embodiment of an area broadcasting with a broadcasting data converter employing the present invention. Broadcasting data stream created by a prefectural station is superposed with RTP (Real-time Transport Protocol) in a communication transmission equipment 901 in the prefectural station, and transmitted via an optical network 912 to a relay station 905 in area A 903 and a relay station 906 in area B 904 for executing area broadcasting. The transmitted data is removed from the trailer of the RTP and restored to the MPEG2-TS by a protocol converter 907. The restored TS is inputted into a broadcasting data converter 101, converted into broadcasting contents suitable for each relay area, modulated in a modulator 902, and then broadcasted in the corresponding area. The broadcasting contents are received, for example, by portable receivers 910 and 911. While the value of the emergency warning broadcasting activation flag is 1, contents of data broadcasting are automatically replaced even in the same area as shown in FIG. 8; and, after a portable receiver moves from area B 904 to area A 903, contents of data broadcasting for area B 904 are automatically replaced with contents suitable for area A 903.

According to the above-mentioned embodiment of the present invention, when the value of the emergency warning broadcasting activation flag in the TMCC of the terrestrial digital broadcasting becomes "1", triggered by the flag information, the broadcasting data can be replaced with small community-based information. Therefore, it is possible to quickly provide emergency evacuation information and disaster information to users by employing the broadcasting data converter.

What is claimed is:

1. A broadcasting data converter for replacing specific data in a first transport stream with data of a second transport stream, comprising:

a transport stream receiving unit for receiving the first transport stream, a replacement data creation unit for creating the second transport stream, a transport stream transmission unit for outputting a replaced transport stream, an emergency information detection means for detecting emergency warning activation flag information in the TMCC signal of the ISDB-T system multiplexed with the first transport stream received by the transport stream receiving unit, a replacement data creation instruction unit for instructing the replacement data creation unit to create replacement data according to the detection results of the emergency information detection unit, a data replacement unit for replacing a part of the first transport stream with the second transport stream data created by the replacement data creation unit according to the detection results of the emergency information detection unit, and a time synchronization unit for correcting a PCR value in the transport stream after the data replacement to synchronize the PCR values in the transport stream before and after the data replacement when specific data in the first transport stream is replaced with data in the second transport stream, wherein, when the first transport stream with the same PID as the second transport stream has entered the data replacement unit, the PCR value of a corresponding transport stream to the second transport stream is updated to a value synchronized with the first transport stream, wherein, when a PES packet with the same PID as the second transport stream has entered the data replacement unit, a PTS in the PES packet is updated, and wherein, when a section packet with the same PID as the second transport stream has entered the data replacement unit, the section packet substitutes in the data replacement unit.

* * * * *